United States Patent
Blomgren et al.

(10) Patent No.: US 6,643,263 B1
(45) Date of Patent: Nov. 4, 2003

(54) DEVICE AND METHOD FOR BUFFER PROTECTION

(75) Inventors: Lars Blomgren, Bagarmossen (SE); Bengt Nordberg, Bergarmossen (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/274,805

(22) Filed: Mar. 23, 1999

(30) Foreign Application Priority Data

| Mar. 31, 1998 | (SE) | 9801132 |
| Jul. 27, 1998 | (SE) | 9802629 |

(51) Int. Cl.⁷ ............................... H04L 12/54
(52) U.S. Cl. .................. 370/236; 370/428; 710/57
(58) Field of Search ............... 370/229, 230, 370/231–234, 235, 235.1, 236, 236.1, 236.2, 238, 363, 428; 710/52, 53, 54, 55, 56, 57

(56) References Cited

U.S. PATENT DOCUMENTS

| 4,887,076 A | 12/1989 | Kent et al. ............. 340/3.43 |
| 4,920,534 A * | 4/1990 | Adelmann et al. ........... 370/474 |
| 5,412,651 A | 5/1995 | Gorshe ................. 370/412 |
| 5,526,362 A | 6/1996 | Thompson et al. ......... 370/516 |
| 6,442,139 B1 * | 8/2002 | Hosein .................. 370/236 |

FOREIGN PATENT DOCUMENTS

| EP | 0237211 | 2/1987 |
| JP | 62/185435 | 8/1987 |
| JP | 0551242 | 1/1993 |
| JP | 6-21970 | 1/1994 |
| JP | 6-97982 | 4/1994 |

* cited by examiner

Primary Examiner—Hassan Kizou
Assistant Examiner—Saba Tsegaye

(57) ABSTRACT

Overflow protection is provided for a buffer of a first-in-first-out type, able to store a first number of messages from a digital module. Pace messages are created and sent to the buffer from the digital module, addressed to the first module, and the pace in which they are sent and received is kept track of. The criterion for sending pace messages is based on the number of sent messages. The sending of messages is halted if a criterion, based on the number of sent pace messages and the number of received pace messages, determines that there exists a risk of overloading the buffer.

18 Claims, 6 Drawing Sheets

DEVICE AND METHOD FOR BUFFER PROTECTION

BACKGROUND

The present invention relates to devices and methods that buffers messages, internal as well as external messages, in connection with messages sent between processes, modules etc, and in particular to protection of a message buffer, working according to the first-in-first-out principle, against overloading.

A digital system comprises different digital units, e.g. processors, which are communicating with each other and which comprises hardware and software. Most processors can only perform one thing at a time, why the software part of the units realises several functions. The functions are normally split into modules, which communicates by sending messages to each other. Some modules are common for several functions, which makes it necessary to queue messages, since they can not operate simultaneously. This is generally achieved by putting them into buffers. Furthermore a function can often be run in several copies (processes) in parallel, which also makes it necessary to queue messages, i.e. put them in buffers. In the field of telephony, several calls can be set up simultaneously.

A buffer may be arranged in different manners. An often used way is that the buffer stores the incoming messages in consecutive order, and the first message entered into the buffer becomes the first message which is forwarded. This first-in-first-out method is common in most processor communication. A buffer has a certain storage capacity. If a buffer has a storage capacity of a certain number of messages from a specific module, the buffer may be overloaded, if the difference between incoming. messages to the buffer and outgoing messages from the buffer becomes larger than the number of storable messages.

In the Japanese patent application JP 62/185435, a method is disclosed, in which a sending unit sets a flag. No further sending is performed before the flag is removed. This is done when the message has left a common sending buffer.

In the patent U.S. Pat. No. 5,412,651, a queue handling method is disclosed, in which each sending unit is assigned a predefined number of time slots. Each unit keeps queue and count down counters for monitoring the number of pending packets.

In the U.S. Pat. No. 4,887,076, a method is illustrated, which informs a sending unit about placing a message in a queue. A disadvantage with the above mentioned solutions is that they all rely on a dedicated communication between the units or modules and the buffer. Such message handling sent to and from the buffer mechanism to the user of the buffer stops or slows down the actual sending of messages. Thus, such solutions may work very well but it can be hard to get an effect quick enough.

Another used approach is time supervision. Time supervision is performed by the user, and implies that the intensity of messages is reduced to the available capacity of the receivers. However, this may in many cases cause more processor load. Furthermore, the maximum allowed intensity has to be equal to the minimum capacity of the mechanism emptying the buffer.

Another a procedure used in prior art uses a control message, going forth and back between the unit and the buffer. The control message which is sent back to the unit itself, is sent as a last message in a batch of messages of the same number as the buffer may contain. Further sending is prohibited until the control message is received. This method has the disadvantage that the buffer capacity is used inefficiently, since the buffer has to be totally emptied, before any new messages can be sent. The prohibition of sending messages is activated for short periods also when the overall traffic intensity is low.

SUMMARY

An object of the present invention is to achieve a buffer protection device and method, which do not have the above mentioned disadvantages. Thus a system in which no separate buffer notification mechanism is included is requested. Furthermore, another object of the invention is to achieve a device and method which are flexible enough to be usable in systems of different capacity.

The above objects are accomplished by a method and devices according to the independent claims. An overflow protection buffer method according to the present invention in a digital unit, which comprises a number of digital modules connected to a message buffer of a first-in-first-out type, able to store a first number x of messages from a first one of said digital modules, is characterised by creating and sending pace messages to the buffer from the first digital module addressed to the first unit itself and keep track of the pace in which they are sent and received back. A pace criterion for sending pace messages and a halt criterion for halting message sending to the buffer are used to insure that less than or equal to x messages are present in the buffer. Said criteria also admits more than one pace message to be present in the buffer simultaneously.

A digital unit including or a module connected to a message buffer of a first-in-first-out type and able to store a first number x of messages from the digital module comprises according to the present invention means for creating a pace message, addressed to the digital module itself, a pace sender for sending the pace message from the digital module to the message buffer when a pace criterion is fulfilled, a receiver for receiving the pace message from the message buffer; and means for halting the process of sending messages from the digital module to the message buffer if a halt criterion is fulfilled.

BRIEF DESCRIPTION OF THE DRAWINGS

The present invention will be more clearly understood by the detailed description of a few explanatory embodiments, with reference to the enclosed drawings, in which.

DETAILED DESCRIPTION

Figure 1:
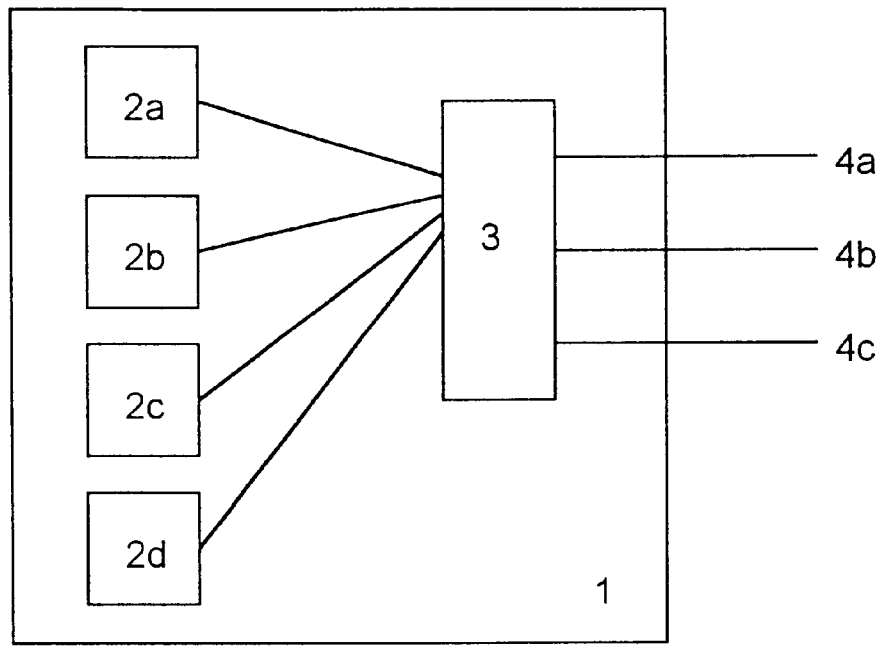
FIG. 1 is a block scheme illustrating a general digital unit comprising a buffer.

By reference to FIG. 1, in a digital unit 1, digital modules 2a–d are producing messages which are supposed to be sent to other modules or digital units. The digital modules 2a–d send the messages to a buffer 3, from which the messages are forwarded when the receiving module or unit is ready for receipt. When such a unit is ready, the message is sent on the connections 4a–4c to the addressed unit. The buffer 3 works in a first-in-first-out manner, which implies that when a message is received in the buffer it is arranged at the last position in a queue of messages waiting to be forwarded. It is always the first message in the queue that is forwarded first.

Figure 2:
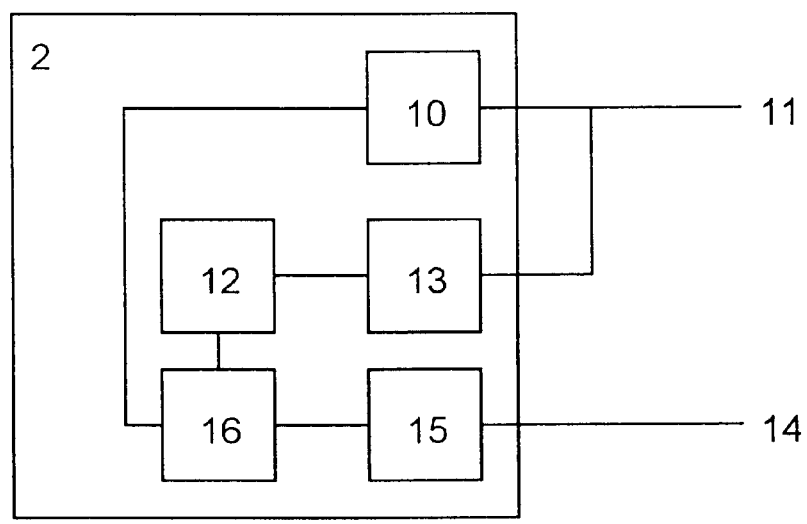
FIG. 2 is a block scheme illustrating an embodiment of a digital module according to thee present invention.

FIG. 2 illustrates a digital module 2 according to the present invention. The digital module 2 comprises means for sending messages 10 to a buffer over an output 11. According to the present invention the digital module 2 also comprises means for creating a pace message, if a pace criterion is fulfilled. This criterion is based on the number of "ordinary" messages sent $n_{os}$ since the last pace message was forwarded. The pace criterion is fulfilled by a $n_{os}$ considerably lower than x, thus allowing several pace messages and associated batches of "ordinary" messages to be present in the buffer simultaneously. The pace message is addressed to the module itself. The pace message is sent by means for sending pace messages 13 to the same buffer as the ordinary messages, also using the output 11. The buffer is therefore totally unaware of if the received message is a pace message or an "ordinary" message.

When a pace message has been processed through the queue of the buffer and has become the first message, the pace message is sent back to the digital module 2 over an input 14, since this module was given as the address of the pace message. The pace message is received in a receiver 15. A means for halting 16 the process of sending "ordinary" messages is informed about the receipt of the pace message. The halting means 16 is also informed about the creation and sending of pace messages. If a halt criterion, based on the number of sent pace messages $n_{ps}$ and the number of received messages $n_{pr}$, is fulfilled, the process of sending "ordinary" messages is stopped, until an additional pace messages is received in order to remove the criterion fulfilment. Since several pace messages and associated "ordinary" messages are required to fill the buffer, $\Delta n_p$, i.e. the difference between $n_{ps}$ and $n_{pr}$, has to be larger than unity to fulfil the halt criterion.

Figure 3:
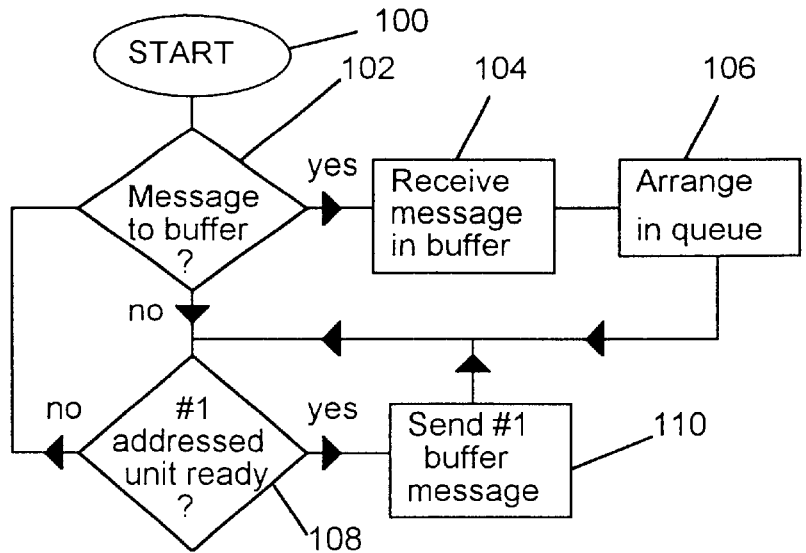
FIG. 3 is a flow diagram illustrating a possible embodiment of a general buffer process.

FIG. 3 illustrates a flow diagram for a general buffer process. The process starts in step 100. In step 102, a decision is made if there is any message coming from any of the connected modules to store in the buffer waiting for the forwarding process. If this is the case, the process continues with step 104, where the message is received by the buffer. In step 106, the new message is arranged in the queue of the buffer, placed at the last position, i.e. in the end of the queue. The process then continues to step 108.

If no message was coming in to the buffer in step 102, the process continues immediately with step 108, in which the buffer checks if the digital unit or module, addressed by the first message in the queue, is ready for reception of a message. If this is not the case the process returns to the step 102, for a repetition of the loop. If the addressed digital unit or module is ready to receive a message, the process continues in step 110, where the first message in the queue is forwarded to the end destination, or a buffer representing it. A new message is now the first one in the queue, and the process proceeds to step 108 again for a repetition.

In such a basic buffer operation, no protection for overloading is present. Such a protection has to be performed by the connected modules and units themselves. The buffer operation is speeded up, since no process power is used for keeping track of the number of messages stored in the queue.

Figure 4:
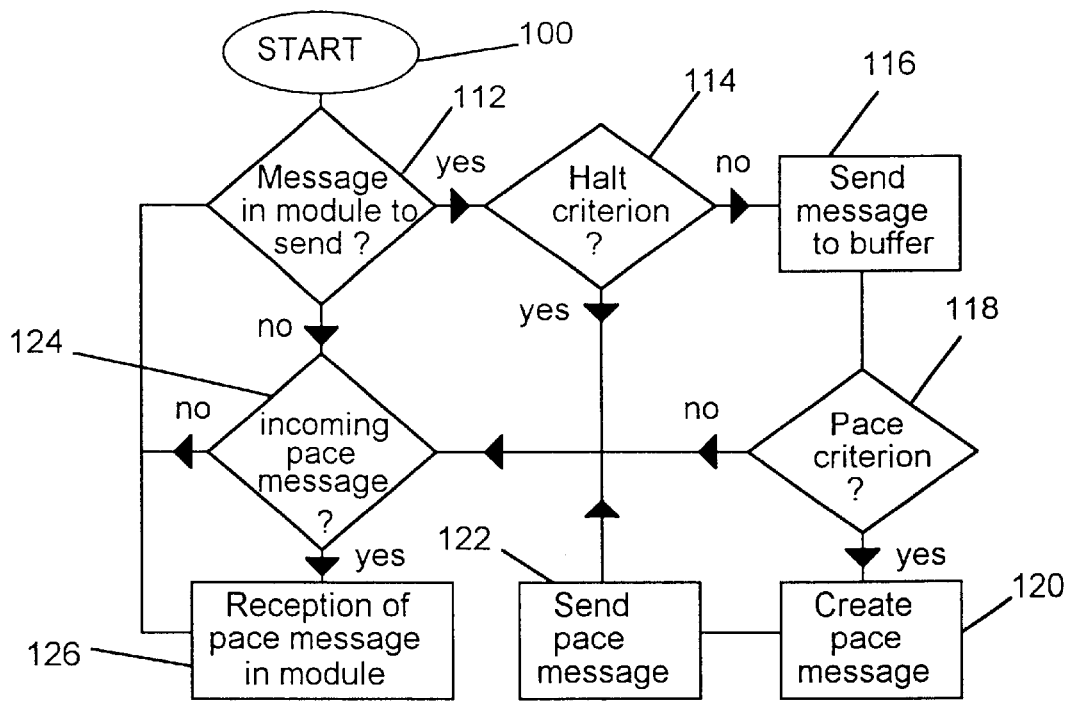
FIG. 4 is a flow diagram illustrating an embodiment of a process of buffer protection in a digital unit according to the present invention.

In FIG. 4, a process in a digital module for a buffer overload protection according to the present invention is illustrated as a flow diagram. The process starts at 100. In step 112 it is decided if there is a message ready for sending in the module. If there is a message ready for sending, the process continues to step 114, where it is checked if a halt criterion is fulfilled. This halt criterion is based on the number of sent pace messages $n_{ps}$ and the number of received messages $n_{pr}$ to the module. The difference $\Delta n_p$ between the number of sent pace messages $n_{ps}$ and the number of returned and received pace messages $n_{pr}$ has to be larger than unity to fulfil the halt criterion. If there is no fulfilled halt criterion, the message is allowed to be sent to the buffer, which is performed in step 116. The number $n_{os}$ is subsequently increased one unit.

After the transmission of the message to the buffer, the process continues in step 118, where it is decided if a pace message is to be sent. If a pace criterion, based on the number of "ordinary" messages sent $n_{os}$ since the last pace message was sent, is fulfilled, the process continues in step 120. The number of sent "ordinary" messages $n_{os}$ required to fulfil the pace criterion is considerably lower than x. Step 120 is the creation of a pace message. The message comprises an identification that the message is a pace message, which identification is readable for the digital module, but not necessarily for the buffer. The pace message is addressed back to the digital module itself. The pace is sent to the buffer in step 122 among the "ordinary" messages, $n_{os}$ is reset to zero and $n_{ps}$ is increased. The buffer do not need to identify the pace message differently from the "ordinary" messages. After the transmission, the process continues in step 124.

If no "ordinary" message is to be sent in step 112, the halt criterion is fulfilled in step 114 or the pace criterion is not fulfilled in step 118, the process continues in step 124. In step 124, it is decided if a pace message is to be received back to the digital module. If there is no pace message arriving, the process start all over again, from step 112. If a pace message arrives to the digital module, it is received in step 126. The reception is noted, in order to keep the halt criterion updated, $n_{pr}$ is increased. The process then returns to the beginning, step 112, again, repeating the above steps.

The above described process takes place in the module, and do not load the buffer with separate notification functions. Additional pace messages are sent, which occupies some capacity for the buffer, however, the overall available capacity for the buffer is increased if the pace and halt criteria are chosen in an appropriate manner, described below.

Figure 5:
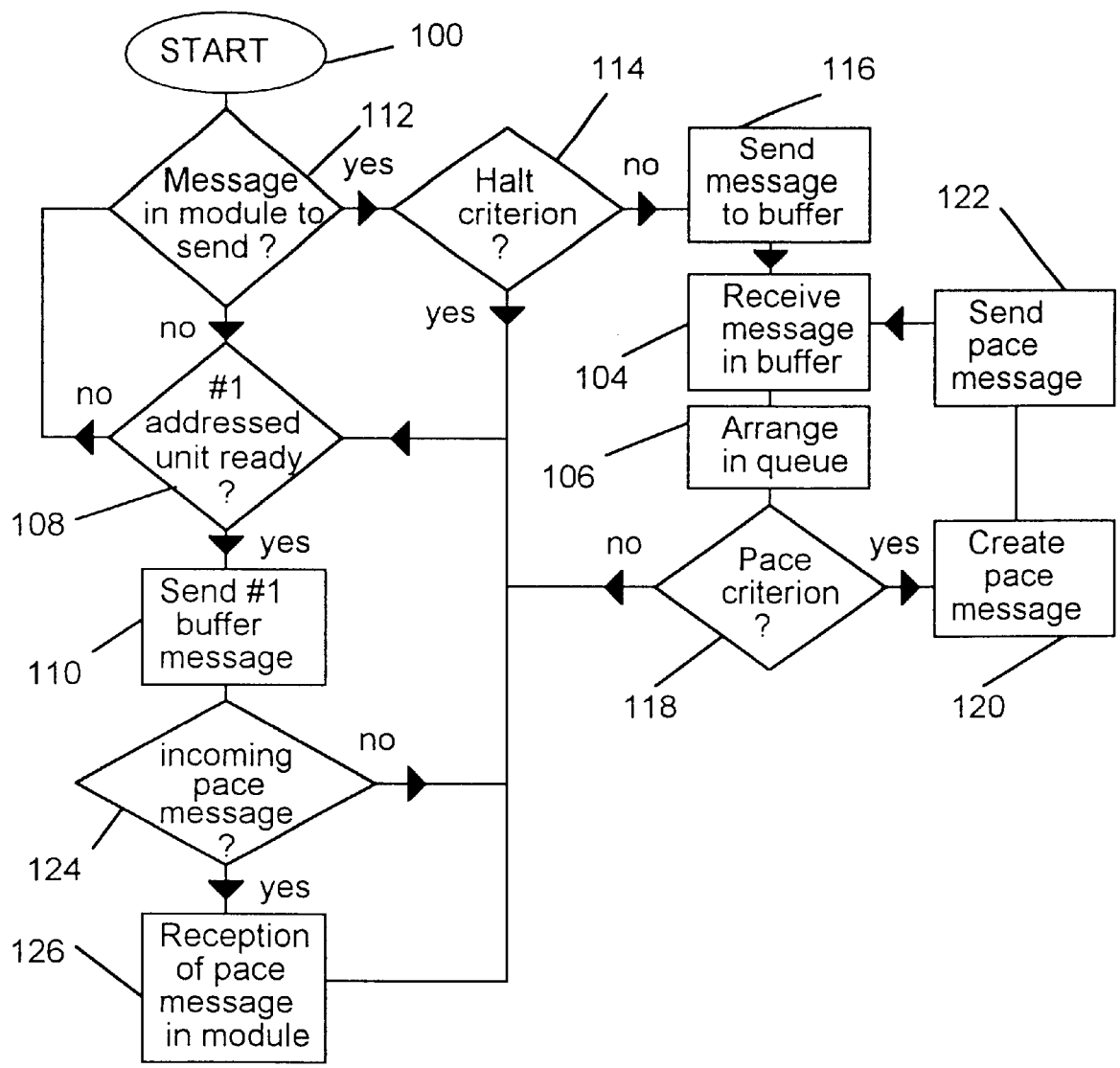
FIG. 5 is a flow diagram illustrating the embodiment shown in FIG. 3 together with a general buffer process.

If the overall buffer process is to be considered, the steps of FIG. 3 and FIG. 4 has to be brought together for co-operation. Such a total view of the buffer process is illustrated in FIG. 5. All reference numbers of the steps are kept, for illustrating the correspondence to the FIGS. 3 and 4.

The process starts in step 100. Step 112 decides if an "ordinary" message is ready for sending. If not, the buffer checks in step 108 if the addressed unit for its first message is ready, if it is the message is sent in step 110, but if not, the process returns to step 112. After sending away the first buffer message, it is checked in step 124 if it was sent to the module itself, i.e. if it was a returned pace message, and if so, received in step 126. The process then returns to step 108.

If a message is available for sending, the halt criterion is checked in step 114, and if sending is halted, the process continues in step 108. If sending is allowed, it is performed in step 116, the message is received in step 104 and arranged in the buffer queue in step 106. If the pace criterion in step 118 is not fulfilled, the process returns to step 108. If a pace message should be sent, the message is created in step 120 and sent in step 122, whereupon the buffer receives it in step 104 and arranges it in its queue in step 106 among its other messages. Since a pace message just was sent, $n_{os}$ is equal to zero, and the process continues to step 108.

The key feature for the above described processes are the criteria. These can be designed with different degrees of flexibility and complexity, depending on the actual system or unit design.

A very simple choice of pace criterion, in one aspect equivalent to the above described prior art procedure, is that a pace message should be sent when there are enough messages sent to fill the buffer, i.e. every mth message, where m=x. The module then only has to keep track on the numbers of "ordinary" messages sent $n_{os}$ since the last pace message. If x-1 "ordinary" messages are sent ($n_{os}$=x-1), the next one should be a pace message.

The most simple halt criterion connected to this pace criterion is that the sent pace message has to be returned before any new "ordinary" messages are allowed to be sent ($n_{pr}$=$n_{ps}$). The difference $\Delta n_p$ between the number of sent pace messages $n_{ps}$ and the number of returned and received pace messages $n_{pr}$ has to be less than 1, i.e. the halt criterion is $\Delta n_p$=1. This criterion choice according to prior art is simple to implement, but has as previously described features which slow down the buffer performance considerably. Since no messages are allowed before the pace message is returned, the buffer has to be totally empty, before a new batch of messages are allowed.

A more efficient approach, according to the present invention, is to use a pace criterion, where the value of m is selected to be a fraction of x, so that several batches of ordinary messages followed by a pace message can be contained in the buffer queue. m is then less than or equal to $$x/2.$$

The corresponding halt criterion will in such a case be that a maximum number of pace messages should be present in the buffer, i.e. the difference $\Delta n_p$ between the number of sent pace messages $n_{ps}$ and the number of returned and received pace messages $n_{pr}$ has to be kept below or equal to a certain value, larger than unity. That is:

$$\Delta n_p = n_{ps} - n_{pr} \leq p, p > 1$$

where p is smaller than or equal to the integer part of $$x/m.$$

A preferred criterion of this type has as high p value as possible, i.e.:

$$p = int(x/m)$$

where int(.) denotes the integer part of the ratio. In such a situation, the buffer does not have to be totally emptied at any time, in order to keep the message flow going, but on the other hand, the number of pace messages are increased, slowing down the flow of "ordinary" messages.

If possible, m should be chosen such that the ratio $$x/m$$

becomes an integer k, larger than unity, in order to use the maximum capacity of the buffer. However, the value of m should be kept relatively high in order not to load the messages stream with too many pace messages, but at the same time relatively low, in order to allow for a maximum average usage of the buffer capacity. These values are therefore chosen to suit the actual system in which it is going to be used.

If the buffer maximum capacity x is a primitive number or if the available integer factors are inappropriate choices due to the discussion above, more sophisticated criteria may be used. The pace criterion could as an example be to send a pace message when $m_i$-1 "ordinary" messages have been sent ($n_{os}$=$m_i$-1) since last pace message, where $m_i$ is an integer associated with pace message number i. That is, each pace message is associated with a separate integer in a set of integers, and the integers may be equal or different from each other. In this way, the sequence of $m_i$:s can in a preferred embodiment be designed to "fill up" the total available buffer storage capacity. The individual $m_i$:s are considerably less than x.

The halt criterion is then modified in a similar manner. The critical value is the sum of the $m_i$ associated with the pace messages sent but not received. This value should never exceed the total available capacity x. Expressed in a mathematical manner this criterion could be written:

$$\sum_{l=n_{pr}+1}^{n_{ps}+1} m_l > x_0$$

where $x_0$ refers to a number less or equal to x. When the above expression is valid, no more messages are sent, until the circumstances are changed so that the expression is no longer valid. $n_{ps}$ and $n_{pr}$ refers as above to the number of pace messages sent and returned, respectively. In a preferred embodiment, $x_0$ is equal to x.

In a preferred embodiment, the pace criterion and halt criterion are possible to vary with time. For instance, If a load on the module is supposed to be heavier during a certain period, e.g. a certain time period of the day, the optimum pace and halt criteria could be different. Such selection of optimum criteria could e.g. be based on the time of the day, the day of the week or month, measured activity level in the module itself or as an option for an operator or external processor.

Three examples will be presented, where one method according to prior art and two embodiments of the present invention are used for three different systems. The examples serve to illuminate the principles and advantages of the method according to the present invention in relation to the method according to prior art, and the actual numbers are only selected to be illustrative. In a real case, totally different numbers may be used.

EXAMPLE 1

Figure 6:
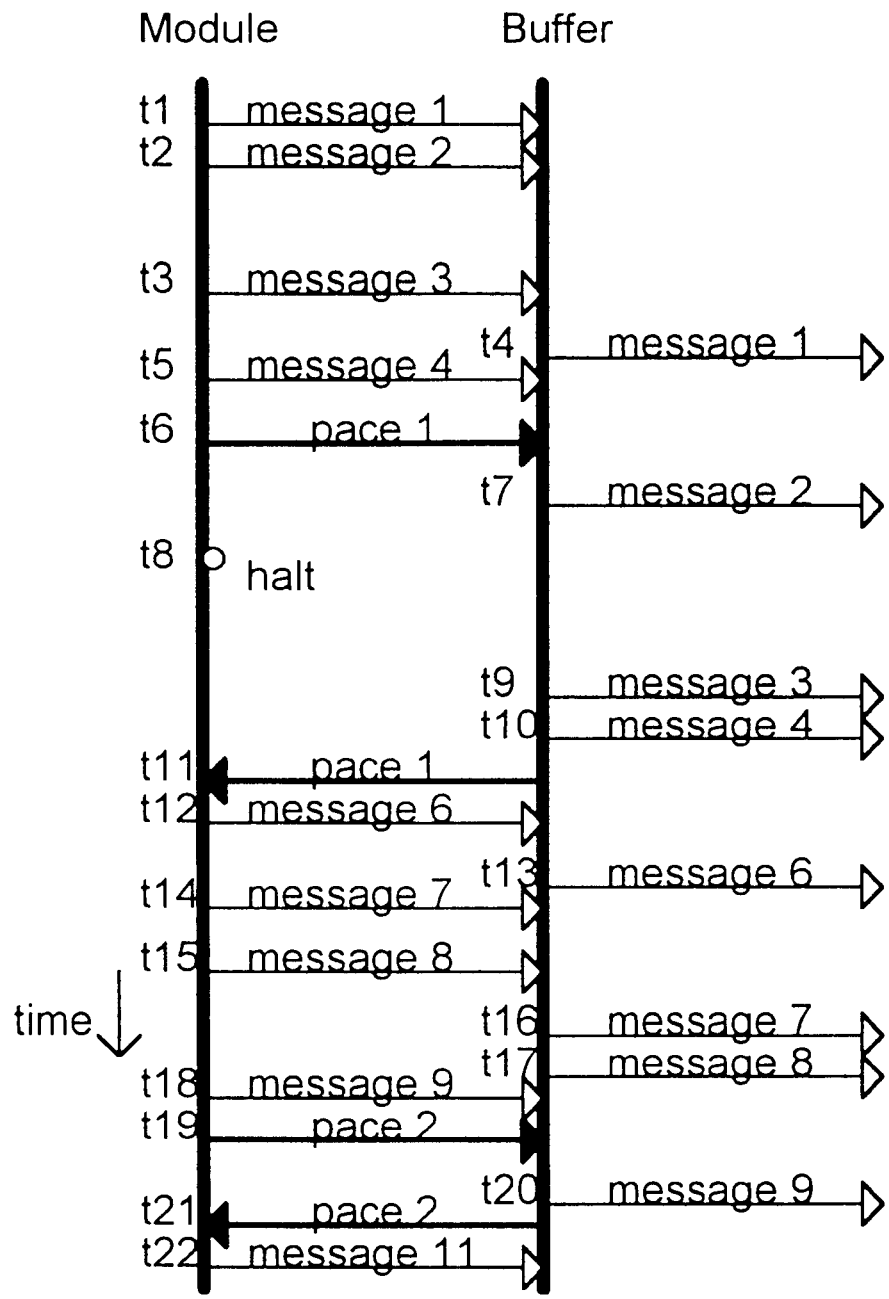
FIG. 6 illustrates the flow of messages for a first example of a method according to prior art.

In the first example, describing a system according to prior art, a module is connected to a buffer with a total capacity of 5 messages only. The pace criterion is selected to be that a pace message is sent every fifth message (m=5). The halt criterion is selected to be that all pace message has to be returned before any further messages could be sent ($\Delta n_p$=0 for allowing sending). A possible scenario is illustrated in FIG. 6.

The left line represents the module and the right line the buffer. Messages are sent between the module and the buffer and from the buffer to other modules. The pace messages are drawn with thicker lines, but treated by the buffer as an "ordinary" message. A time scale is directed along the vertical direction. At times t1, t2 and t3, three messages are sent from the module to the buffer. At time t4, message 1 is forwarded to the addressed module. At t5 message 4 is sent to the buffer and since the pace criterion $n_{os}$=4 then is fulfilled, a first pace message is sent at t6. At t7, message 2 is forwarded to the addressed module. At a time t8, a further message is ready to be sent to the buffer, but the halt criterion $\Delta n_p$=1 states that no new messages are allowed to be sent before all pace messages are returned. At times t9 and t10, messages 3 and 4 are forwarded, and subsequently pace message 1 is first in the buffer queue and returned at t11 to the module. The halt criterion is no longer fulfilled, $\Delta n_p$=0, and a message 6 (message 5 is the first pace message) is sent to the buffer at t12, which then is forwarded at time t13. The delay time, in which the buffer was locked and the module had to wait corresponds to the time difference between t12 and t8. Messages 7 and 8 are sent at t14 and t15, respectively, and forwarded at times t16 and t17, respectively. Message 9 is sent at t18, and the pace criterion is once more fulfilled, $n_{os}$=4, why a second pace message is sent at t19. Message 9 is forwarded at t20 and the second pace message is then returned to the module at t21. The unit is now ready for another batch of messages, since the halt criterion, $\Delta n_p$=1, no longer is fulfilled.

EXAMPLE 2

Figure 8:
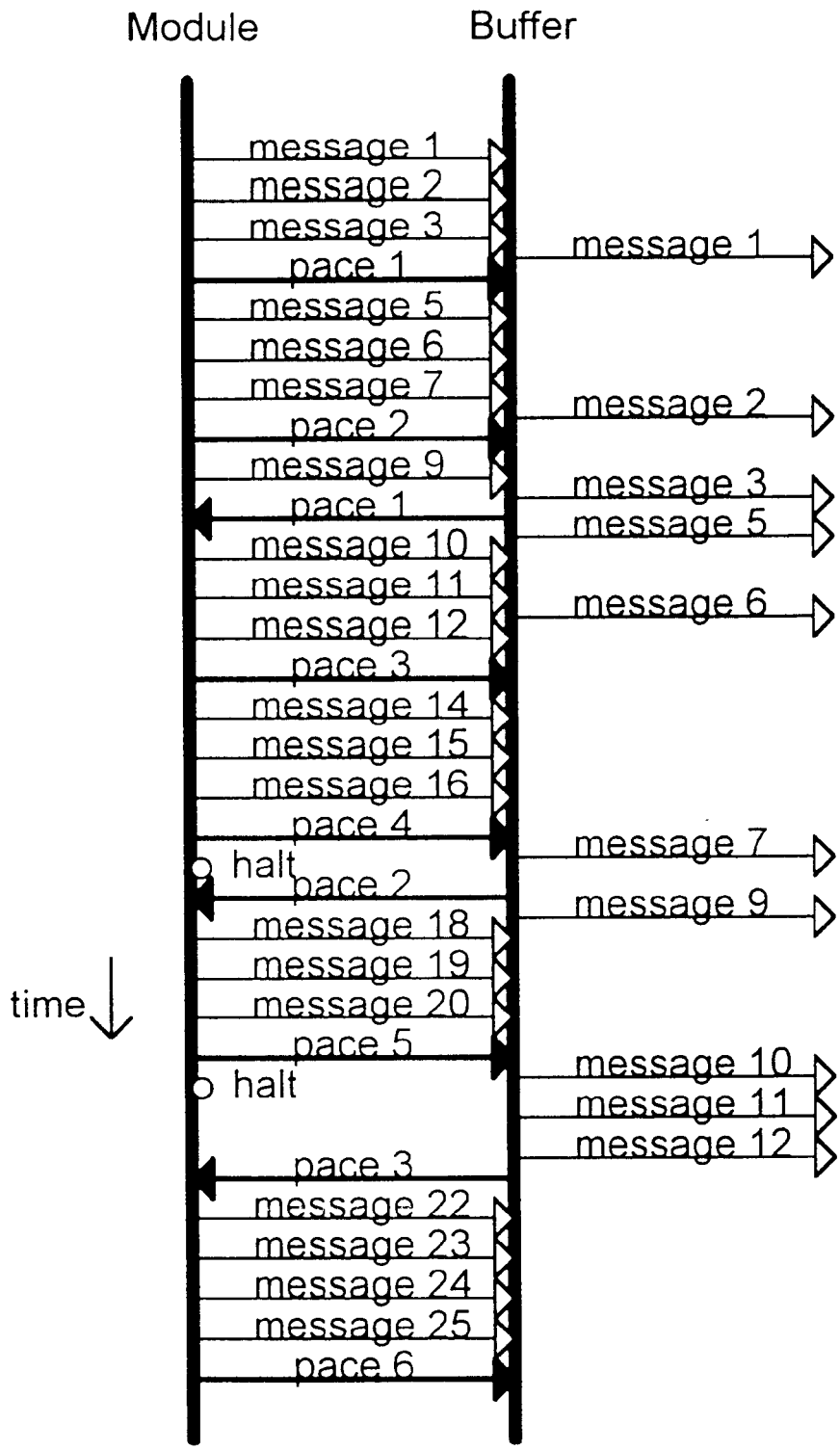
FIG. 8 illustrates the flow of messages for a third example of a method according to the present invention.

In the second example, illustrating a system according to the present invention, a module is connected to a buffer with a total capacity of 12 messages. The pace criterion is selected to be that a pace message is sent every fourth message (m=4). The halt criterion is selected to be $\Delta n_p$=3, that is at most two pace message could be unreturned, i.e. the sending is halted when a third pace message is sent. A possible scenario is illustrated in FIG. 8.

Three messages are sent from the module to the buffer, and one is forwarded to the addressed module. A pace message is sent due to a fulfilled pace criterion $n_{os}$=3. Three more messages are sent to the buffer, and the message 2 is forwarded from the buffer to the addressed module. A second pace message is again due to a fulfilled pace criterion $n_{os}$=3 sent to the buffer. The buffer now contains 6 messages (Nos. 3–8), of which two are pace messages. Another message is sent from the module to the buffer before the buffer forwards message 3. Pace message 1 is now situated at the top of the buffer queue and is subsequently returned to the module, giving $n_{ps}$=2, $n_{pr}$=1. Message 5 is forwarded to the addressed module. The buffer now contains four messages, of which one is a pace message.

Messages 10 and 11 are sent to the buffer, message 6 is forwarded and a third pace message is sent to the buffer. No halt criterion is fulfilled ($\Delta n_p$=2), since only two pace messages are present in the buffer. Pace message 1 is already returned. Message 7 is forwarded and pace message 2 (message no. 8) is returned to the module, $n_{pr}$=2. The buffer now contains four messages, of which one is a pace message. Three more messages are sent to the buffer, and message 9 is forwarded. Pace message 4 is sent, since the pace criterion $n_{os}$=3 is fulfilled. Three more messages (17–19) are sent and message 10 is forwarded. A fifth pace message is sent. The buffer now contains ten messages, of which three are pace messages, and $n_{ps}$=5, $n_{pr}$=2. Since three pace messages are unreturned, the halt criterion is fulfilled, $\Delta n_p$=3, and further messages can not be sent at this time.

When message 11 is forwarded from the buffer, pace message 3 becomes number one in the buffer queue and is returned to the module. The halt criterion is no longer fulfilled and more messages are allowed to be sent.

EXAMPLE 3

In the third example, a module is connected to a buffer with a total capacity of 13 messages. The pace criterion is based on a set of individual $m_i$:s according to the following list:

i: 1 2 3 4 5 6 7 8 9 10 11 12 . . .

$m_i$: 3 3 4 3 3 4 3 3 4 3 3 4 . . .

The halt criterion is selected to be:

$$\sum_{l=n_{pr}+1}^{n_{ps}+1} m_l > 13$$

Figure 7:
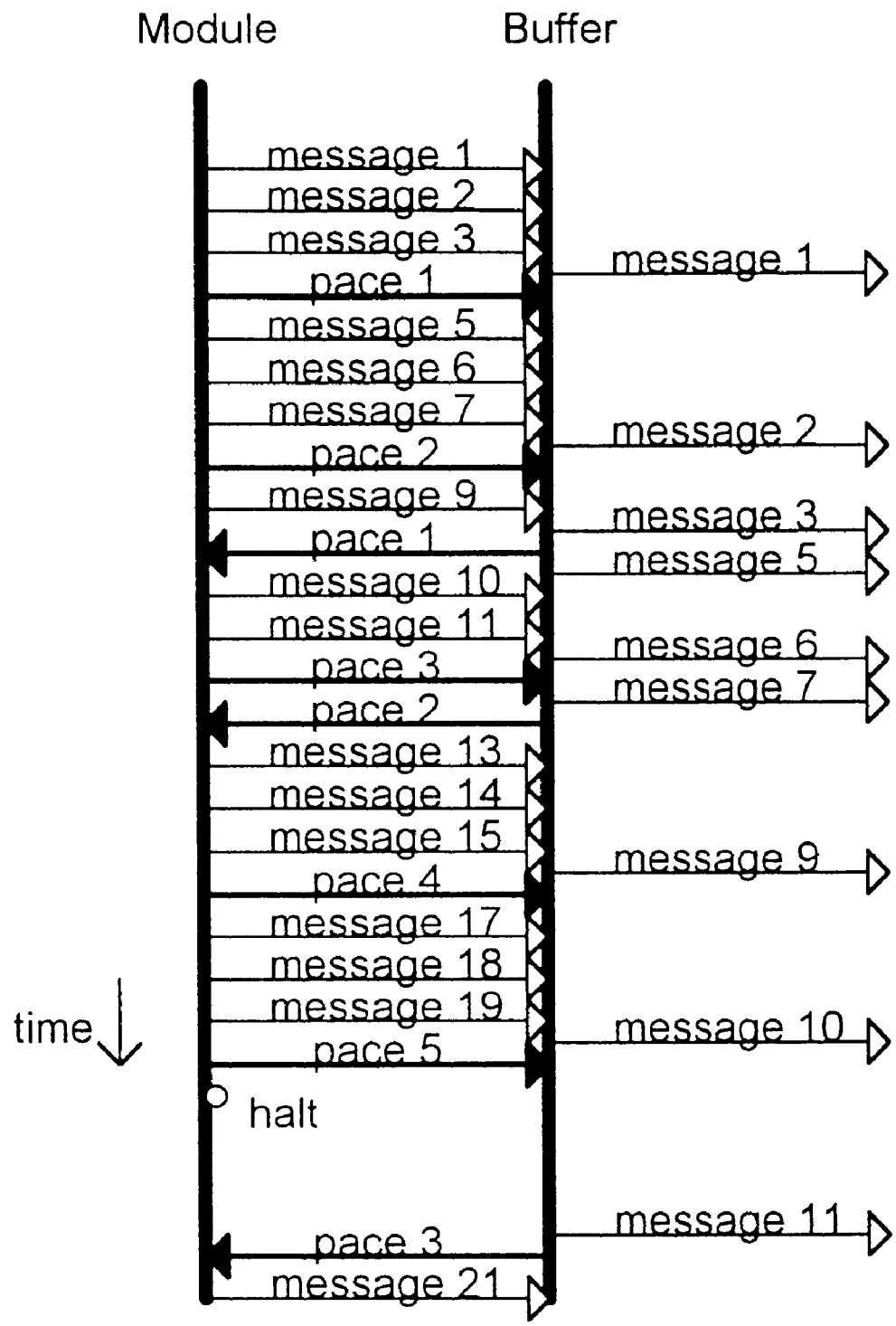
FIG. 7 illustrates the flow of messages for a second example of a method according to the present invention.

A possible scenario is illustrated in FIG. 7.

First three messages are sent to the buffer, and one is forwarded. The pace criterion for the first pace message is fulfilled, since $m_1$=3. The first pace message is sent. Three more messages are sent to the buffer, but only one is forwarded. Pace criterion for i=2 is fulfilled, and a second pace message is sent. Message 9 is sent to the buffer and message 3 is forwarded and pace message 1 is returned. The buffer now contains five messages and the halt criterion sum has the value of 7, i.e. message sending is not halted.

Message 5–6 are forwarded and three more messages are sent to the buffer. The pace criterion is fulfilled, since $n_{os}$=4, which is equal to $m_3$. Pace message 3 is sent. Three more messages are sent to the buffer and as a result the fourth pace message. The buffer contains 11 messages, of which three are pace messages. The halt criterion sum has the value of 3+4+3+3=16, i.e. sending of new messages is halted.

Messages 7 and 9 are forwarded, and pace message 2 is returned, which reduces the halt criterion sum to 13, which allows further messages to be sent to the buffer. Messages 18–20 are sent to the buffer together with pace message 5 and the sending is halted, since the halt criterion sum now has the value of 17. The buffer now contains 12 messages. When messages 10–12 are forwarded, pace message 3 is returned and sending is once more allowed.

Anyone skilled in the art will understand that other modifications and variations within the scope of the invention as defined by the enclosed claims are possible. The flow diagrams in FIGS. 3–5 are, for instance, only one possible way to express the invention. Other specific solutions of process flows are possible to find, without leaving the scope of the present invention.

What is claimed is:

1. A method for buffer overflow protection in a digital unit, said digital unit comprising a number of digital modules connected to a message buffer of a first-in-first-out type, able to store a first number x of messages from a first one of said digital modules, said method comprising the steps of:

sending messages from said first digital module to said message buffer;

receiving, in said message buffer, said messages;

arranging, in said message buffer, said messages in consecutive order in a queue in; said message buffer;

when a digital module addressed by the first message in said queue is ready for reception of a message, sending said first message from said message buffer to said addressed digital module;

creating, in said first digital module, a pace message, addressed to said first digital module;

sending said pace message from said first digital module to said message buffer when a pace criterion is fulfilled, said pace criterion being based on the number of sent messages $n_{os}$ since the last pace message was sent, whereby the number $n_{os}$ required to fulfill said pace criterion is considerably lower than x;

receiving, in said first digital module, said pace messages from said message buffer; and halting the process of sending messages from said first digital module to said message buffer if a halt criterion is fulfilled, said halt criterion being based on the number of sent pace messages $n_{ps}$ and the number of received pace messages $n_{pr}$, whereby a difference $\Delta n_p$ between the number of sent pace messages $n_{ps}$ and the number of received pace messages $n_{pr}$ necessary to fulfill said halt criterion is larger than unity.

2. The method for buffer protection according to claim 1, wherein said pace criterion is that the number of sent messages since the last pace message was sent $n_{os}$ is equal to a predetermined positive first integer $m_{n_{ps}+1}-1$, where $m_j$ is a set of positive first integers, larger than one, but considerably less than said first number x, for j=1, 2, 3, . . . ; and said halt criterion is that $$\sum_{l=n_{pr}+1}^{n_{ps}+1} m_l > x_0$$

where $x_0$ is a positive integer less or equal to x.

3. The method for buffer protection according to claim 2, wherein $x_0$ is equal to x.

4. The method for buffer protection according to claim 2, wherein the step of sending said pace messages comprises sending said pace messages from said first digital module to said message buffer every mth message, where m is a positive first integer, larger than one, but less than or equal to $$x/2;$$

and the step of halting comprises halting the process of sending messages from said first digital module to said message buffer if said difference $\Delta n_p$ between said number of sent pace messages $n_{ps}$ and said number of received pace messages $n_{pr}$ equals a positive second integer p, smaller than or equal to the integer part of $$x/m,$$

but larger than unity.

5. The method for buffer protection according to claim 4, wherein said second integer p is equal to the integer part of $$x/m.$$

6. The method for buffer protection according to claim 4, wherein said first number x is equal to m·k, where k is a positive third integer, larger than unity.

7. A digital module connected to a message buffer of a first-in-first-out type and able to store a first number x of messages from said digital module, said digital module comprising:

a message sender for sending messages from said digital module to said message buffer for further transmission to other receiving digital modules, means for creating a pace message, addressed to said digital module;

a pace sender for sending said pace message from said digital module to said message buffer when a pace criterion is fulfilled, said pace criterion being based on the number of sent messages $n_{os}$ since the last pace message was sent, whereby the number $n_{os}$ required to fulfill said pace criterion is considerably lower than x;

a receiver for receiving said pace message from said message buffer; and means for halting the process of sending messages from said digital module to said message buffer if a halt criterion is fulfilled, said halting means comprising means for registering of the number of sent pace messages $n_{ps}$ and the number of received pace messages $n_{pr}$, said halt criterion being based on said number of sent pace messages $n_{ps}$ and the number of received pace messages $n_{ps}$, whereby a difference $\Delta n_p$ between the number of sent pace messages $n_{ps}$ and the number of received pace messages $n_{pr}$ necessary to fulfill said halt criterion is larger than unity.

8. The digital module according to claim 7, wherein said pace criterion is that the number of sent messages since the last pace message was sent $n_{os}$ is equal to a predetermined positive first integer $m_{n_{ps}+1}-1$, where $m_j$ is a set of positive first integers, larger than one, but considerably less than said first number x, for j=1,2,3, . . . ; and said halt criterion is that $$\sum_{l=n_{pr}+1}^{n_{ps}+1} m_l > x_0$$

where $x_0$ is a positive integer less or equal to x.

9. The digital module according to claim 8, wherein $x_0$ is equal to x.

10. The digital module according to claim 8, wherein said pace sender is arranged for sending said pace message from said digital module to said message buffer every mth message, where m is a positive first integer, larger than one, but less than or equal to $$x/2;$$

and said halting means is arranged for halting the process of sending messages from said digital module to said message buffer if the difference $\Delta n_p$ between said number of sent pace messages $n_{ps}$ and said number of received pace messages $n_{pr}$ equals a positive second integer p, smaller than or equal to the integer part of $$x/m,$$

but larger than unity.

11. The digital module according to claim 10, wherein said second integer p is equal to the integer part of $$x/m.$$

12. The digital module according to claim 10, wherein said first number x is equal to m·k, where k is a positive third integer, larger than unity.

13. A buffered digital unit comprising:
   a number of digital modules; and
   a message buffer of a first-in-first-out type connected to said digital modules, said buffer being able to store a first number x of messages from a first one of said digital modules,
   wherein said first digital module comprises:
      a first message sender for sending messages from said first digital module to said message buffer;
      means for creating a pace message, addressed to said digital module;
      a pace sender for sending said pace message from said digital module to said message buffer when a pace criterion is fulfilled, said pace criterion being based on the number of sent messages $n_{os}$ since the last pace message was sent, whereby the number $n_{os}$ required to fulfill said pace criterion is considerably lower than x;
      a receiver for receiving said pace message from said message buffer; and
      means for halting the process of sending messages from said digital module to said message buffer if a halt criterion is fulfilled, said halting means comprising means for registering of the number of sent pace messages $n_{ps}$ and the number of received pace messages $n_{pr}$, said halt criterion being based on said number of sent pace messages $n_{ps}$ and the number of received pace messages $n_{pr}$, whereby a difference $\Delta n_p$ between the number of sent pace messages $n_{ps}$ and the number of received pace messages $n_{ps}$ necessary to fulfill said halt criterion is larger than unity; and
   wherein said message buffer comprises:
      a receiver for receiving said messages;
      means for arranging of said messages in consecutive order in a queue; and
      a second message sender for sending, when the addressed digital module for the first message waiting in said queue is ready for reception of a message, said message from said message buffer to said addressed digital module.

14. The digital unit according to claim 13, wherein
   said pace criterion is that the number of sent messages since the last pace message was sent $n_{os}$ is equal to a predetermined positive first integer $m_{n_{ps}-1}-1$, where $m_j$ is a set of positive first integers, larger than one, but considerably less than said first number x, for j=1, 2, 3, . . . ; and
   said halt criterion is that, $$\sum_{l=n_{pr}+1}^{n_{ps}-1} m_l > x_0$$

where $x_0$ is a positive integer less or equal to x.

15. The digital unit according to claim 14, wherein $x_0$ is equal to x.

16. The digital unit according to claim 14, wherein
   said pace sender is arranged for sending said pace message from said digital module to said message buffer every mth message, where m is a positive first integer, larger than one, but less than or equal to $$x/2;$$

and
   said halting means is arranged for halting the process of sending messages from said digital module to said message buffer if the difference $\Delta n_p$ between said number of sent pace messages $n_{ps}$ and said number of received pace messages $n_{pr}$ equals a positive second integer p, smaller than or equal to the integer part of $$x/m,$$

but larger than unity.

17. The digital unit according to claim 16, wherein said second integer p is equal to the integer part of $$x/m.$$

18. The digital unit according to claim 16, wherein said first number x is equal to m·k, where k is a positive third integer, larger than unity.

* * * * *